United States Patent
Nordgard

[15] 3,688,905
[45] Sept. 5, 1972

[54] PURIFICATION ASSEMBLY

[72] Inventor: Carl Sigvard Nordgard, Nacka, Sweden

[73] Assignee: Svenska Interpur AB, Nacka, Sweden

[22] Filed: April 17, 1970

[21] Appl. No.: 29,581

[30] Foreign Application Priority Data

April 22, 1969   Sweden ..................... 5732/69

[52] U.S. Cl. ................................. 210/151, 261/92
[51] Int. Cl. ........................................... B01d 21/18
[58] Field of Search ............... 210/150, 151; 261/92

[56] References Cited

UNITED STATES PATENTS

| | | | |
|---|---|---|---|
| 2,433,884 | 1/1948 | Bevan | 210/151 X |
| 3,294,378 | 12/1966 | Grimes | 261/92 |
| 3,325,154 | 6/1967 | McDonnell | 261/92 |
| 3,389,798 | 6/1968 | Hartmann et al. | 210/150 |
| 3,563,383 | 2/1971 | Hellquist | 210/151 X |
| 3,565,797 | 2/1971 | Gresham | 210/151 X |
| 2,022,329 | 11/1935 | Tsuda | 210/151 |
| 3,335,081 | 8/1967 | El-Naggar | 210/150 X |

Primary Examiner—John Adee
Attorney—Sughrue, Rothwell, Mion, Zinn & Macpeak

[57] ABSTRACT

A water purifier comprises a helical screw of sheet material carrying biologically active microorganisms. The helix is fitted around a horizontal, rotating shaft, and the outer periphery of the helix is tightly fitted within a cylindrical casing. End walls close off the casing, and a water inlet is provided in one end wall and a water outlet in the other, opposite end wall. Water traveling through the casing must traverse the helix surfaces and thus be subject to purification action, and cannot pass between the outer edges of the helix and the casing.

5 Claims, 7 Drawing Figures

Patented Sept. 5, 1972
3,688,905
2 Sheets-Sheet 1
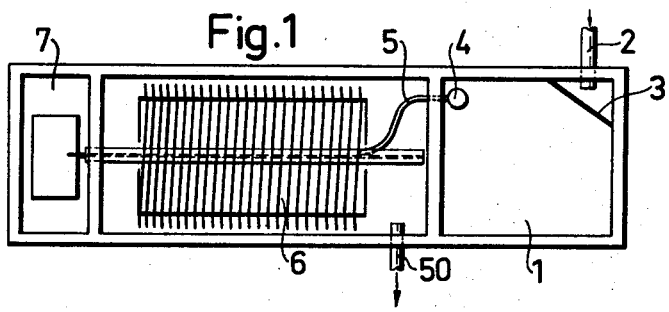
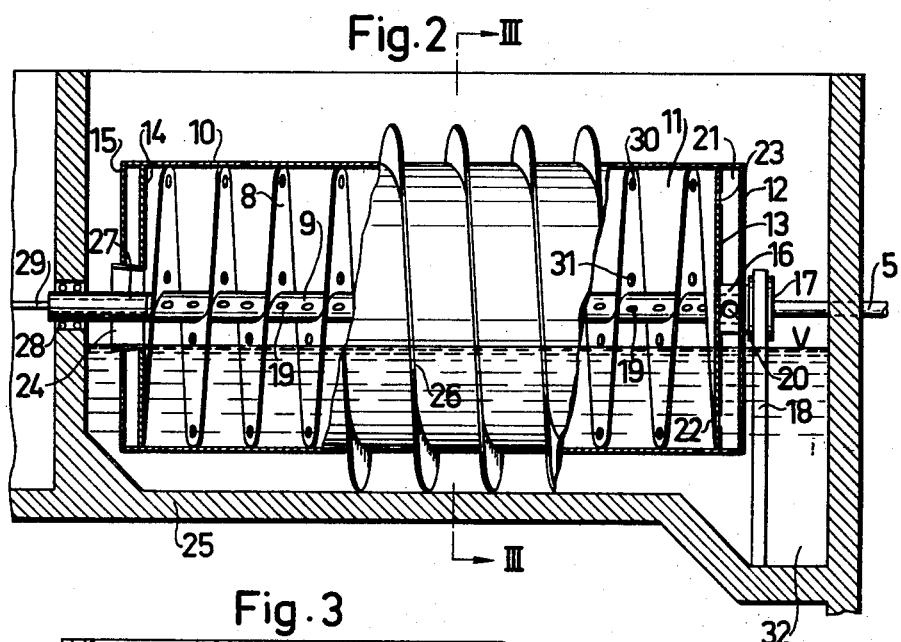
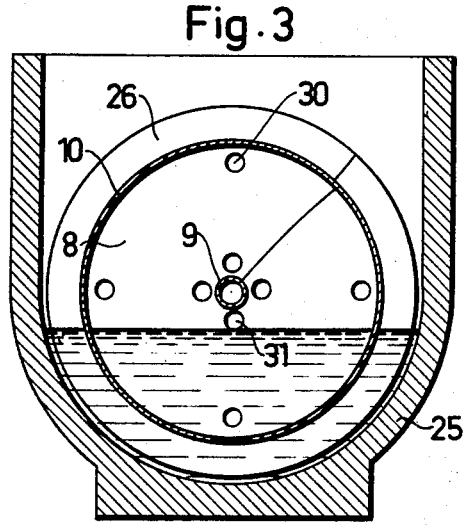
INVENTOR
CARL SIGVARD NORDGARD
BY Sughrue, Rothwell, Mion,
Zinn & Macpeak
ATTORNEYS

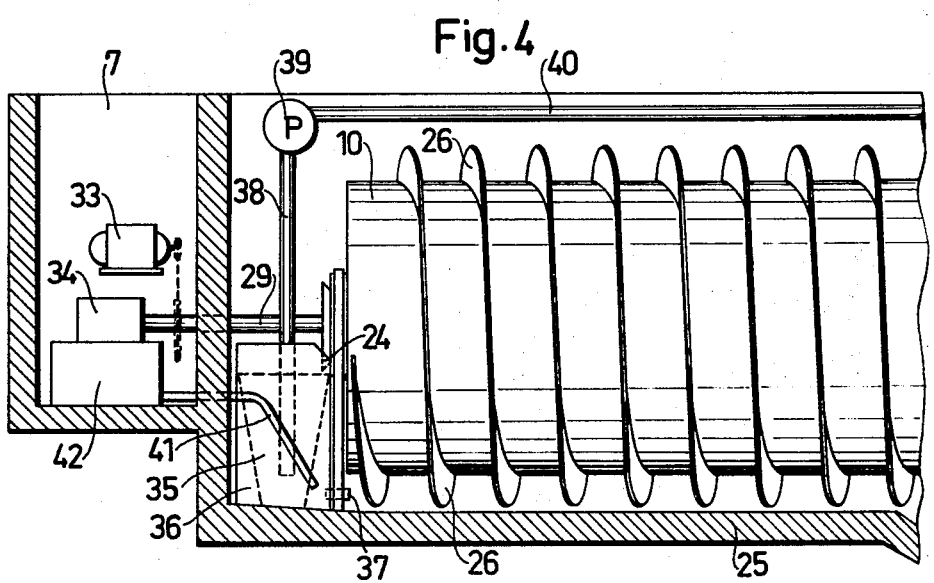
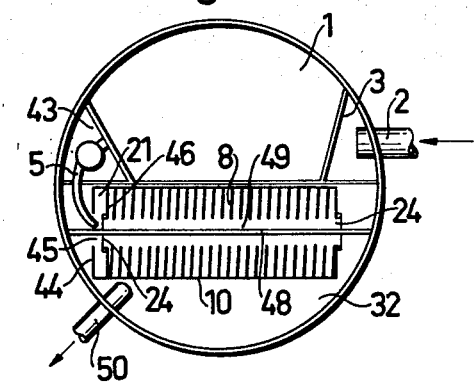
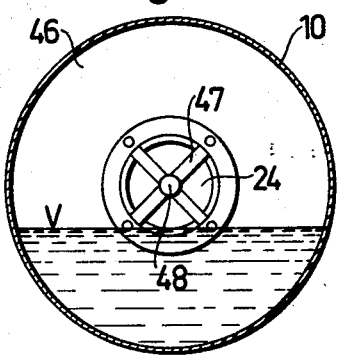
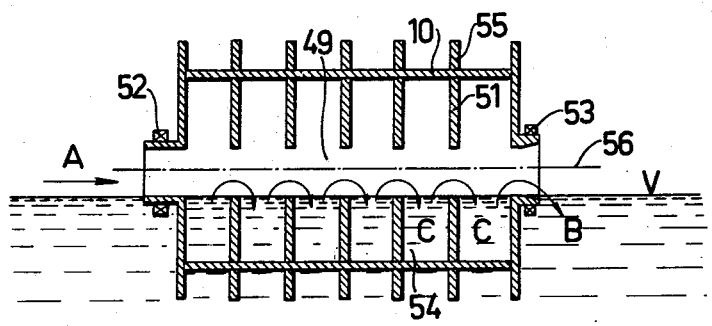

PURIFICATION ASSEMBLY

This invention relates to a purification assembly for originally contaminated water, such as for instance waste water, of the type comprising areas which support active microorganisms, and having their circumferences located along a cylindrical plane, said areas partially being located immersed in the water and slowly rotating about a substantially horizontal axis.

In known embodiments of this type the said areas are formed on a helix or on disc elements located adjacent in mutually parallel and coaxial relationship, which approximately up to their common axis of rotation are disposed immersed in the waste water occupying a trough, the walls of which as closely as possible fit to said cylindrical plane. The disc elements or the helix have a considerable weight, which is further increased by the build-up of a mass of dead microbes on the areas, which results in that some axial deflection cannot be avoided. This fact has as a consequence that the spacing between the peripheries of the disc elements or the top line of the helix threads and the wall of the trough must be made so great as surely to evade any danger of contact. In practical realisation said spacing will exceed 2 centimeters which involves that contaminated water can pass past the active areas along the trough wall and thus flow through the entire purification plant without becoming subjected to the action of the active microorganisms. Therefore, a single purification assembly of the type in consideration cannot attain a higher degree of purification than about 40 to 60 per cent. One has tried to overcome this drawback by conducting the waste water substantially transversally to the planes of the disc elements and in this way actually attained a highly satisfying purification effect of the order of 90 to 95 per cent. However, in spite of this favorable flow which thus is obtained by conducting the waste water against the disc surfaces and not as in earlier embodiments allowing said water to flow into the trough in parallel to the disc surfaces, it cannot be avoided that some quantity of contaminated waste water by-passes the assembly.

One main object of the invention is to provide a purification assembly which entirely eliminates the risk of by-passing waste water. A further object of the invention is to provide a purification assembly which has considerably lower weight than the aggregates available hitherto.

The substantial characterizing feature of the invention consists thus therein that the disc-shaped elements are surrounded by a tight cylindrical casing closely fitting to said circumferences and united with the elements, a first end wall unit and a second end wall unit being sealingly connected to the one and the other, respectively, of the ends of said casing, and an inlet for waste water being arranged on the one end wall unit and an outlet for purified water on the second end wall unit.

The invention will hereinafter be described more in detail with reference to various embodiments shown by way of example in the accompanying drawings, of which:

FIG. 1 is a diagrammatic view of purification system comprising an assembly embodying the invention;

FIG. 2 is a lateral view or an enlarged scale of the assembly shown in FIG. 1;

FIG. 3 is a sectional view following line III—III of FIG. 2;

FIG. 4 shows the assembly of FIG. 2 connected to a device for chemical precipitation of phosphates;

FIG. 5 is a top view of another purification plant constructed according to the invention;

FIG. 6 is a view of the left-hand end wall of the assembly shown in FIG. 5;

FIG. 7 shows an embodiment of a purification assembly having parallel disc elements.

FIG. 1 illustrates a purification plant having a presettling basin 1, to which organically contaminated water is supplied through an inlet 2. Provided ahead of the discharge opening of the inlet is a foam retaining screen 3. From the basin 1 the water is conducted into a tube 4 having in its bottom zone slots (not shown). From the tube 4 the waste water is conducted through a pipe 5 to a purification assembly 6 and passes through the purification assembly in the axial direction thereof to an outlet 50. FIG. 1 also indicates a space 7 for a driving motor and a fan, if desired, and a device for chemical purification, as will be described later in more detail.

The assembly 6 is shown in FIG. 2 to consist of a screw or helix 8 having constant diameter and a pitch which in practical realisation is about 1 to 2 centimeters, by which —in response to various circumstances —may vary within wide limits. The helix 8 constitutes the disc-shaped, biologically active elements defined above and has been manufactured by interconnecting the edges of slotted circular blanks. In the embodiment shown in FIG. 2 the helix 8 is mounted on a central hollow shaft 9. Preferably both the helix 8 and the shaft 9 are made of some plastic material such as polyvinyl chloride, for example. The circumference of the helix 8 coincides with the mantle plane of a cylinder. Connected to the circumference is a tight cylindrical casing 10 which is rigidly connected to, and in some cases also sealingly united with, the crest of the helix 8. Thus a continuous helical chamber 11 is formed between the cylindrical casing 10 and the helix 8. Attached in a sealing manner to the right-hand end of the cylindrical casing 10 is an end wall unit consisting of two mutually parallel and coaxial and mutually parallel disc elements 14, 15. The end wall unit 12, 13 carries a support element 16 for a bearing 17 located on a stand 18. Although not illustrated in FIG. 2, the left-hand end wall 14, 15 unit is provided with a support member of the kind shown in FIG. 6. The support element 16 is connected to a shaft journal (not shown) which is mounted in the bearing 17 and in turn connected with the hollow shaft 9. This shaft journal not shown is hollow and is through its bore in communication with the supply pipe 5 for waste water. The bore formed in the shaft journal communicates with holes 20 formed in the support element 16, and the water flows through said holes into the chamber 21 defined by the end walls 12 and 13. This chamber 21 has in the wall 13 a flow passage opening 22 and preferably at least one additional flow passage opening 23. During normal operation the waste water flows through that of the openings 22, 23 which is positioned below the water surface V, into the space between the wall 13 and the first helix thread and is advanced by the rotating helix in such a manner that the entire helical space 11 is filled with water up to a level which is defined by the lower edge of the outlet 24 (FIG. 6). During the motion of the water through the slowly rotating helix a biological purification of the water is effected in a manner known per se, and the biological sludge produced by the biological purification is discharged by the helix through the outlet 24 and falls down to the bottom of the basin 25 from which it is removed in any appropriate manner. The external surface of the cylindrical casing 10 is shown in FIG. 2 to be provided with a conveyor screw 26 which as a pitch directed opposed to the pitch of the helix 8 and which closely follows the bottom of the basin 25 and thus during rotation of the purification assembly brought about by a motor 33 (FIG. 4) connected to a shaft 27 mounted in the bearing 28 and coupled to the hollow shaft 9 advances the sludge to an aftersettling chamber 32. The shaft 9 is formed with openings 19 for passage of air, and thus air can be supplied to the space of the helical chamber 11 located above the water surface 9 and free from liquid. At its right-hand end adjacent the wall 13 the shaft 9 is closed. Thus, possibly required fresh air can be supplied from, for instance, a compressor or fan 34 (FIG. 4), which air preferably is preheated during the cold season. Required circulation of air and discharge of gases formed within the liquid-free space of the chamber 11 is effected by holes 30 and/or 31 formed in the helix 8. The holes 31 are located above the normal water level V determined by the outlet 24 and together with the chamber 21 and the openings 23 they constitute a control means. If for some reason, the supply of water through the pipe 5 should exceed the normal flow of water, the water surface in the chamber 21 will rise to the opening 23 and the water flow through said opening into the chamber 11. The water level in the chamber 11 will in this case rise to a highest position adjacent the wall 13 and gradually fall to the lower edge of the outlet 24. In order to increase the passage of water, it is also possible to increase the number or revolutions of the helix without incurring any appreciable risk of reducing the degree of purification since in the present case all water will be brought to contact with the active areas. The number of revolutions can be varied through a device scanning the water level and controlling the motor.

FIG. 4 shows a purification aggregate of the type described above which is connected to a sludge separator 35 to which purified water and sludge are fed from the outlet 24. The sludge separator 35 is formed with net-covered holes not shows here, through which the pure water can escape into a tight container 36 surrounding the sludge separator 35 and from said container through an outlet opening 37 near the bottom of container 36 into the basin 25. Sludge collected in the sludge separator 35 is sucked off through a tube 40 by a sludge pump 39 into the presettling basin 1 so that all biologically active sludge is collected at one place for further treatment. The biologically purified water discharged from the outlet 24 normally contains a considerable quantity of nutritive salts among which in particular the phosphates have proved to promote choking of lakes and other water courses and therefore must be eliminated. Such an elimination is effected in the plant shown in FIG. 4 by feeding suitable chemicals into the purified water purified water contained in the basin 25 through a conduit 41 from a vessel 42, which as a suitable substance may contain aluminum sulphate which precipitates the phosphates in the form of water-insoluble aluminum phosphate. The aluminum phosphate constitutes a slurry which by the conveyor 26 is fed to the aftersettling basin 32 which is shown in FIG. 2 and from which the slurry is removed in any suitable known way.

It is obvious that the conveyor screw 26 can be dispensed with and instead the bottom of the basin 25 be given a slope to cause the slurry to collect at one end of the assembly.

FIG. 5 is top view of a purification plant of a minor type. The plant is provided with a presettling chamber 1 having an inlet 2, a retaining screen 3 and an equalization chamber 43 for changes occurring during the 24 hours of each day. The contaminated water is conducted by control members not shown here from the chamber 43 through the pipe 5 to the purification assembly. This assembly includes in the same manner as that described hereinbefore a helix 8 surrounded by a cylindrical casing 10. In the embodiment now in consideration the left-hand end wall unit consists of an outer wall 44 having a central opening 45 into which the pipe 5 opens. The assembly is mounted on an inner wall 46 by means of a bearing 47 formed with central through-passage openings 24. In the present embodiment the assembly is carried by a shaft 48 extending from end to end and with its ends mounted in bearings in a manner not shown here. The right-hand end of the assembly is also provided with a bearing 47. The central openings 49 of the individual turns of the helix have a considerably larger diameter than that of the shaft 48 for which reason air can freely pass through the active areas. Purified water and sludge are fed out through the right-hand bearing 47 and the sludge is deposited in the aftersettling basin 32. The water flows out through the outlet 50. In practical tests with small plants which irregularly and seldom are emptied of sludge the risk has proved to exist that a putrefaction of the sludge can occur in the aftersettling basin if the water is not very rich in oxygen. As the water flows from the outlet 24 of the assembly along the entire assembly to the outlet 50 it is possible to utilize the rotation of the casing 10 for supplying oxygen to the water. Such admixture of oxygen can be brought about by, for instance, forming the external surface of the cylindrical casing with wings or blades or similar members which entrain air into the water. The surface of the casing as well as the active areas may also be provided with a layer of sand or some other suitable granular material which assists in the desired oxygen supply.

In FIG. 7 an embodiment of an assembly according to the invention is presented the active areas of which are formed as circular disc elements 51 positioned in coaxial and parallel relationship to one another and to a rotatable shaft 56. Each disc element is with its outer circumference in sealingly attached to the cylindrical casing 10 and formed with a central opening 49. Bearings 52 and 53, respectively, are provided adjacent the central openings of each of the uttermost disc elements and each bearing is supported by suitable means such as brackets, for example. Contaminated water is introduced into the assembly in the direction of the arrow A and the tight chambers 54 between each pair of adjacent disc elements 51 are filled with water up to level V. The water flows due to supply of additional water from the chamber located uttermost at left-hand to the subsequent chambers as is indicated by the arrows C. It should be noted that FIG. 7 does not show more than the principle for the assembly and that the various dimensions represented in the Figure do not correspond to the real values. Thus the spacing between the disc elements is normally between 10 and 20 millimeters and the diameter of the disc elements varies normally between 40 and 300 millimeters.

In a diagrammatic manner wings 55 of the type described in connection with the description of FIG. 5 are indicated externally on the cylindrical casing 10.

Besides of the essential advantage set forth above that all waste water introduced passes the biologically active areas, the invention further has the advantage that a very rigid structure is obtained due to the feature that the cylindrical casing 10 and the disc elements 51 united therewith constitute an area-supporting shell structure. As a consequence thereof, the entire assembly except for the shaft journals can be made of very thin plastic material. Both the casing and the disc elements can thus be manufactured of glas-fiber reinforced polyester plastic or polyvinyl chloride having a thickness of about 1 millimeter, for example. An additional advantage is that a shaft of steel for carrying the disc elements is not required any longer for which reason the assembly can be made cheap and with light weight.

It should be noted also that the supply of waste water through the opening or openings 22, the flow passage area of which is determined with regard to the desired quantity of water passing through the assembly, is effected approximately at right angles to the active area on the first thread of the helix whereby a turbulent flow is brought about. This results in a considerable increase of the purification effect.

An essential advantage of the assemblies described hereinbefore resides further therein that sludge cannot be assembled inside of the assemblies as has been the case with known plants within which a heavy sedimentation of sludge occurs on the bottom of the trough containing the water.

Obviously, the invention is not limited to the specific embodiments shown and described, but its scope is to be determined by the appended claims.

What is claimed is:

1. A waste water purification apparatus, comprising:
   a. a plurality of generally circular, disc-shaped elements carrying biologically active microorganisms on the surfaces thereof and being spaced in close proximity to each other along a horizontal axis, the outer peripheries of the elements lying along a common, cylindrical surface of revolution, and forming a helix,
   b. a cylindrical casing, open at both ends, surrounding the elements and being rigidly and tightly engaged with the outer peripheries thereof along their entire circumferences, thereby defining a helical purification chamber within the casing,
   c. first and second end wall units individually and sealingly connected to to the opposite ends of the casing,
   d. a waste water inlet on the first end wall unit,
   e. a purified water outlet on the second end wall unit, and
   f. means for rotating the casing about the horizontal axis, to force waste water to travel through the apparatus and traverse and contact the surfaces of the elements and thereby not pass directly between the outer peripheries of the elements and the casing.

2. A purification apparatus as claimed in claim 1, wherein the helix (8) is provided with aerating holes (30, 31) in each individual turn to permit circulation of air in an axial direction.

3. A purification apparatus as claimed in claim 1 further comprising a driven shaft coextensive with the horizontal axis of the helix, and wherein the inner periphery of the helix (8) is rigidly mounted on the shaft (9).

4. A purification apparatus as claimed in claim 3 wherein the shaft (9) has a longitudinal bore and openings (19) communicating with said bore are formed along the entire longitudinal extension of the shaft between each pair of adjacent turns of the helix, one end of said shaft being connected to a source (34) for the supply of air.

5. A purification apparatus as claimed in claim 1 further comprising:
   a. a basin surrounding the apparatus and having a settling chamber in the bottom thereof adjacent the first end wall unit, and
   b. a screw conveyor externally disposed around the casing for conveying any sludge discharged from the water outlet to the settling chamber.

* * * * *